Figure 1:
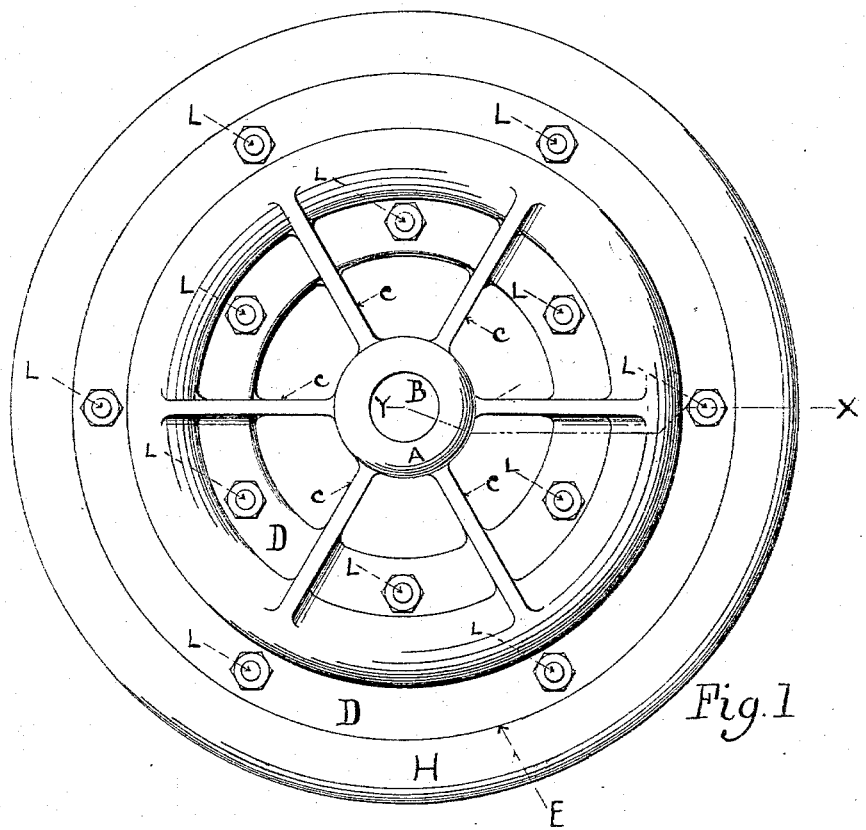

(No Model.)

W. C. PYOTT.
CAR WHEEL.

No. 546,248. Patented Sept. 10, 1895.

WITNESSES
M. W. Collet
Wm Hendrickson.

INVENTOR.
Walter C. Pyott
by R.C.Albright
attorney

United States Patent Office.

WALTER C. PYOTT, OF PHILADELPHIA, PENNSYLVANIA, ASSIGNOR TO HIMSELF AND OTTO J. HAEGLER, OF SAME PLACE.

CAR-WHEEL.

SPECIFICATION forming part of Letters Patent No. 546,248, dated September 10, 1895.

Application filed January 4, 1895. Serial No. 533,867. (No model.)

*To all whom it may concern:*

Be it known that I, WALTER C. PYOTT, a citizen of the United States, residing in the city and county of Philadelphia and State of Pennsylvania, have invented a new and useful Improvement in Car-Wheels, of which the following is a specification.

My invention relates to improvements in car-wheels made in two separable parts, one part being the rim or tread and its flange and the other part being the center or hub which fits on the axle and carries the rim or tread and its flange, the two parts being secured together preferably by bolts passing through both and securely holding each to the other; and the object of my invention is to secure a ready and rapid method of removing the rim or tread and its flange from the hub portion, when from frequent applications of the brakes required in stopping the tread becomes worn out of round, or from the skidding of the wheels flat spots are worn on the tread, which causes jolting and jarring of the body structure and hammering of the rails, these imperfections being particularly frequent in street-car wheels from the wear of the sand, which it is necessary to apply in great quantities where self-propelling cars are used, owing to the slippery condition of the rails and also from the great brake power which it is necessary to suddenly apply to avoid collisions with vehicles and pedestrians on city streets. It is also essential that the wheels should not be heavy or cumbersome on account of the comparatively light weight they carry, and to be in keeping with the body structure they support, therefore, I construct the hub portion with spokes. It is also desirable to deaden the rumbling noise and the metallic ringing caused by the wheels in passing over the rails and crossings and the vibrations caused by the motor-gearing, and to lessen this noise and annoyance as much as possible I form a pocket, preferably on the hub portion about midway of the diameter of the plate, in which I insert a deadening material or substance, which is compressed and held in place by the annular web of the rim or tread and its flange part when secured to the hub part. When the treads of these wheels become defective, they can be dropped with their axle from the pedestals, and by removing the bolts a new and perfect rim or tread and its flange can be quickly and readily applied, the hub part remaining upon its axle for an indefinite number of applications of perfect rims or treads and their flanges. The rims or treads and their flanges that are removed can be ground true in pairs and again applied and used. It will readily be seen that by making the internal diameter of the rim under the flanges where they fit the hub part of equal diameters rims of different diameters may be used with one and the same construction of the hub part. I attain these objects by the mechanism illustrated in the accompanying drawings, in which—

Figure 2:
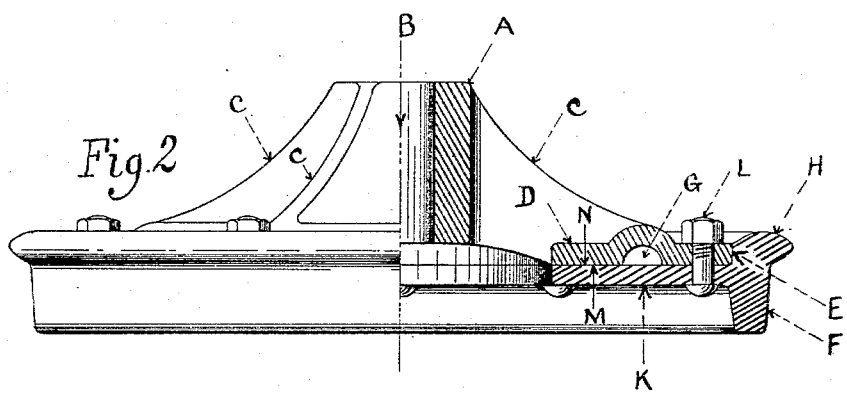

Figure 1 is a side view of the wheel from the hub side. Fig. 2 is one half in section on line X Y, Fig. 1, and one half an exterior view of the edge of the wheel.

Similar letters refer to similar parts throughout the views.

I construct the central part of the wheel with a hub A, as is usual in car-wheels, the hub being bored out at B to fit on the axle. Outwardly extending from the hub A are spokes C, and formed at their outer ends is a plate D, which is turned true at its extreme outer edge E, where it closely fits metal to metal under the outer rim, which composes the tread and its flange, making a firm nonelastic support from the hub A to the supporting-face of the tread F. Between the hub A and the outer edge of the plate D, and about midway of the plate D, I construct a recess or pocket G, into which I introduce any suitable deadening material.

The outer rim H of the wheel, which comprises the tread F and its flange J, has constructed on its inner diameter an annular web K, the inner diameter of this web K being the same as the inner diameter of the plate D, but larger in diameter than the hub, and through the plates D and web K are introduced bolts L for the purpose of firmly securing the two parts of the wheel together, metal to metal, and also to press the deadening material firmly into the pocket G. The face M of the web K and the face N of the plate D are turned true to secure a perfect contact of metal to metal, and the seat E under the flange J and the outer edge E of the plate D are each made true to secure a firm fit, metal to metal, of all surfaces of the two parts of the wheel where they come together, as my wheel is intended to be as solid as two separable parts can be constructed in the manner shown, my wheel not be cushioned or elastic, but simply deadened, and is not in any sense intended to be yielding.

I am aware that wheels have been constructed in two parts, one of which was the hub and a plate and the other was the tread and a plate, and that the two parts were secured together by bolts through plates, those wheels being without spokes; but in those wheels there was introduced an elastic packing between the plates, and in some cases at the tread and also at the hub, which is not the case in my wheel, as the material in the pocket G is not elastic and yielding, but firm and tight when secured by the bolts, and my wheel is made with spokes to lighten it. I do not therefore make any claim to an elastic or yielding wheel; but

I claim—

The combination in a car wheel, of a central portion composed of a hub, spokes therefrom connecting the hub to an outer circular plate, said outer circular plate having two flat surfaces with a single pocket formed between them, and an outer integral rim portion having an annular web, the flat surfaces of the circular plate being bolted to the inside of the annular web by a line of bolts each side of the single pocket metal to metal, and diametral contact being made between the two parts of the wheel only at the periphery of the outer circular plate on a seat formed under the flange of the integral rim portion, and back of the annular web, substantially as described.

In witness whereof I have hereunto set my hand this 1st day of January, 1895.

WALTER C. PYOTT.

Witnesses:
R. C. WRIGHT,
OTTO J. HAEGLER.